(12) United States Patent
Gautier et al.

(10) Patent No.: US 7,480,700 B2
(45) Date of Patent: Jan. 20, 2009

(54) METHOD AND SYSTEM FOR RETRIEVAL AND USAGE OF REMOTE ENTRY POINTS

(75) Inventors: Patrice Gautier, San Francisco, CA (US); Jeffrey L. Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 968 days.

(21) Appl. No.: 10/833,387

(22) Filed: Apr. 27, 2004

(65) Prior Publication Data

US 2006/0031383 A1 Feb. 9, 2006

(51) Int. Cl.
  *G06F 15/16* (2006.01)
(52) U.S. Cl. ............... 709/217; 709/203; 709/227; 709/231; 709/232; 709/245; 709/246; 709/248; 719/329
(58) Field of Classification Search ............. 709/203, 709/217, 227, 231, 232, 245, 246, 248
See application file for complete search history.

(56) References Cited

U.S. PATENT DOCUMENTS

| | | | |
|---|---|---|---|
| 5,774,668 A * | 6/1998 | Choquier et al. | 709/223 |
| 6,006,269 A * | 12/1999 | Phaal | 709/227 |
| 6,006,333 A * | 12/1999 | Nielsen | 726/8 |
| 6,336,137 B1 * | 1/2002 | Lee et al. | 709/219 |
| 6,490,624 B1 * | 12/2002 | Sampson et al. | 709/227 |
| 6,665,706 B2 | 12/2003 | Kenner et al. | 707/203 |
| 6,874,152 B2 * | 3/2005 | Vermeire et al. | 719/330 |
| 7,146,638 B2 * | 12/2006 | Malcolm | 726/11 |
| 7,206,806 B2 * | 4/2007 | Pineau | 709/203 |
| 7,257,642 B1 * | 8/2007 | Bridger et al. | 709/238 |
| 2004/0268451 A1 | 12/2004 | Robbin | |
| 2005/0021478 A1 | 1/2005 | Gautier | |
| 2005/0050345 A1 | 3/2005 | Dowdy et al. | |

* cited by examiner

*Primary Examiner*—Michael Won

(57) ABSTRACT

A method for communicating between a client application and one or more servers is disclosed. In one embodiment, it is first determined whether a particular client application operation is the type of operation that requires a remote entry point. If a remote entry point is needed, the client application obtains a remote entry point file from a remote server computer and retrieves the remote entry point required by the client application operation such that it can direct the operation to the proper remote server.

20 Claims, 7 Drawing Sheets

METHOD AND SYSTEM FOR RETRIEVAL AND USAGE OF REMOTE ENTRY POINTS

BACKGROUND OF THE INVENTION

1. Field of the Invention

The present invention relates to client-server computer environments and, more specifically, to interactions between client applications (e.g., media management applications) and server computers.

2. Description of the Related Art

Media players, such as digital media players, are specialized portable computing devices that store and present (e.g., play, display) digital media (e.g., music, videos, or images). Often media players are small hand-held devices with limited media storage capacity and limited media management capability. As a result, media players typically associate with a host computer. The host computer can utilize an application resident on the host computer to perform media management for the host computer and the media player, such management including purchasing of media items, downloading purchased media items, and transfer of the media items and their attributes between the host computer and the media player. One such media management application is iTunes™, produced by and available from Apple Computer, Inc. of Cupertino, Calif. An example of a popular media player is an iPod™ which is also produced by and available from Apple Computer, Inc.

In designing a media management application, decisions must be made regarding how to implement various features such as searching, browsing, previewing, purchasing, and delivering media items. Many of these features may be hard coded into the application or, alternately, they may be associated with a server application.

However, it can be difficult to predict in advance which specific servers are going to be used to run the various server applications. Hard coding of addresses to specific server computers directly into an application is not desirable, given that servers may go down, addresses changed or otherwise become inaccessible. In addition, hard coding of addresses to specific servers in an application is problematic because any changes in the addresses requires that the application be altered through a program update or reinstallation in order for the application to properly interact with servers whose addresses have changed.

Thus, there is a need for improved techniques to implement a client application, such as a media management application, whereby access to server application is able to be altered without code changes to the client applications.

SUMMARY OF THE INVENTION

The invention pertains to improved techniques for communicating between a client application operating on a client computer and one or more server computers. The improved techniques enable remote entry points on remote servers to be flexibly assigned and utilized at client applications without code changes at the client applications.

The invention can be implemented in numerous ways, including as a method, system, device, apparatus, graphical user interface, or computer readable medium. Several embodiments of the invention are discussed below.

According to one embodiment of the invention, a client application operating on a client computer checks if a client application operation requires a remote entry point. Upon determining that a remote entry point is required, the client computer obtains a set of remote entry points for at least one remote server computer. The remote entry point associated with the client application operation is then retrieved from the set of remote entry points and the client application operation is directed to a remote server in accordance with the retrieved remote entry point.

According to another embodiment of the invention, a server computer receives a request from a client computer for a set of remote entry points. The server computer retrieves an appropriate set of remote entry points and then transmits them to the client computer.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques for communicating between a client application operating on a client computer and one or more server computers. The improved techniques enable remote entry points on remote servers to be flexibly assigned and utilized at client applications without code changes at the client applications.

Figure 1:
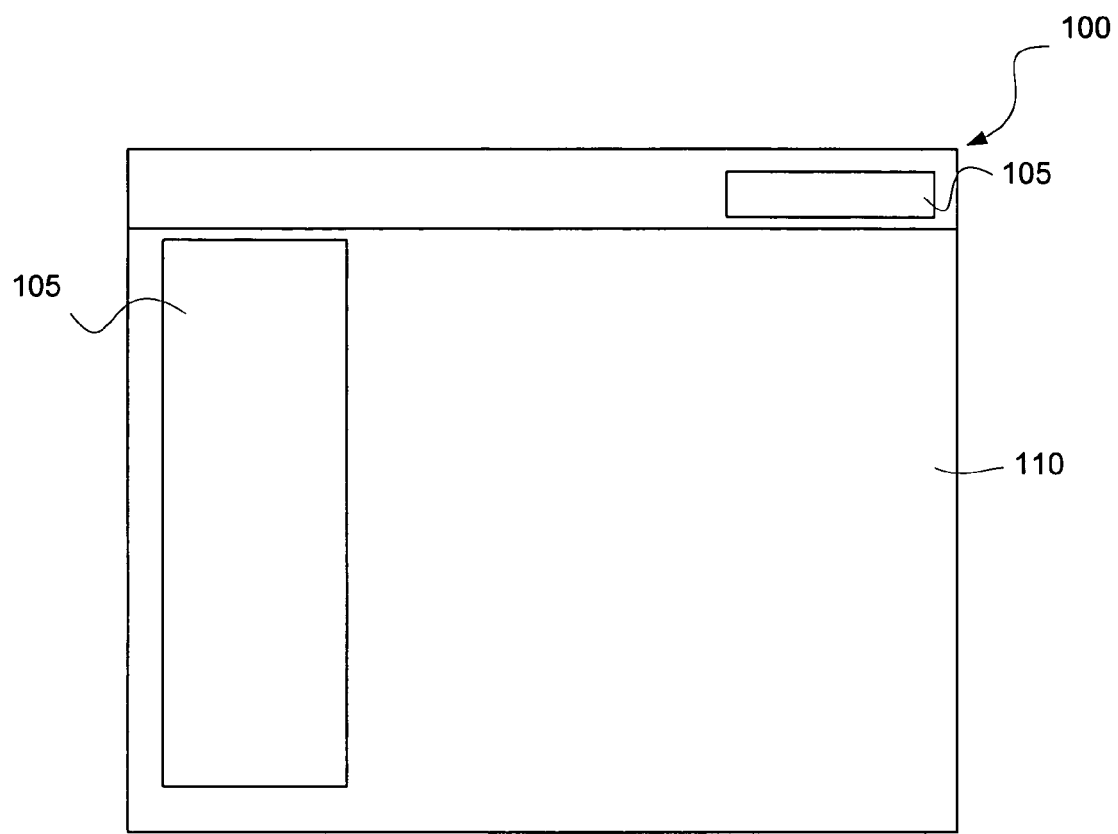
FIG. 1 is a block diagram of a generic application window according to one embodiment of the invention.

FIG. 1 is a block diagram of a generic application window 100 according to one embodiment of the invention. The generic application window 100 is produced by a client application operating on a client computer and contains one or more program controls 105. The program controls 105 are a means for the client application to obtain input from the user and/or to request information to be displayed for the user. As an example, the program controls 105 can be user interface components, such as text boxes, menus and hyperlinks. These program controls 105 are associated with operations of the client application. The operations, although associated with the client application, at least partially rely on interaction with another computer, such as a remote server. The client computer couples to the other computer via the Internet or some other suitable network. The generic application window 100 also contains one or more display areas 110 which may be used to display text and/or graphics.

One example of a client application is iTunes™, which is produced by and available from Apple Computer, Inc. of Cupertino, Calif. The iTunes™ application can produce a graphical user interface that resembles the generic application window 100 containing several program controls 105. The iTunes™ application can be referred to as a media management application for various media items. The media items can pertain to audio items (e.g., audio files or songs, such as for music or audiobooks), video items (e.g., video files or movies), or image items (e.g., photos). The program controls 105 for the iTunes™ application might pertain to operations, such as, search, browse, login, buy, or might be a hyperlink to a remote server. In any case, once an operation is activated or initiated at the iTunes™ application, the iTunes™ application executes the associated operation, which can require access to remote server computers as described in reference to FIGS. 2-6, discussed below.

Figure 2:
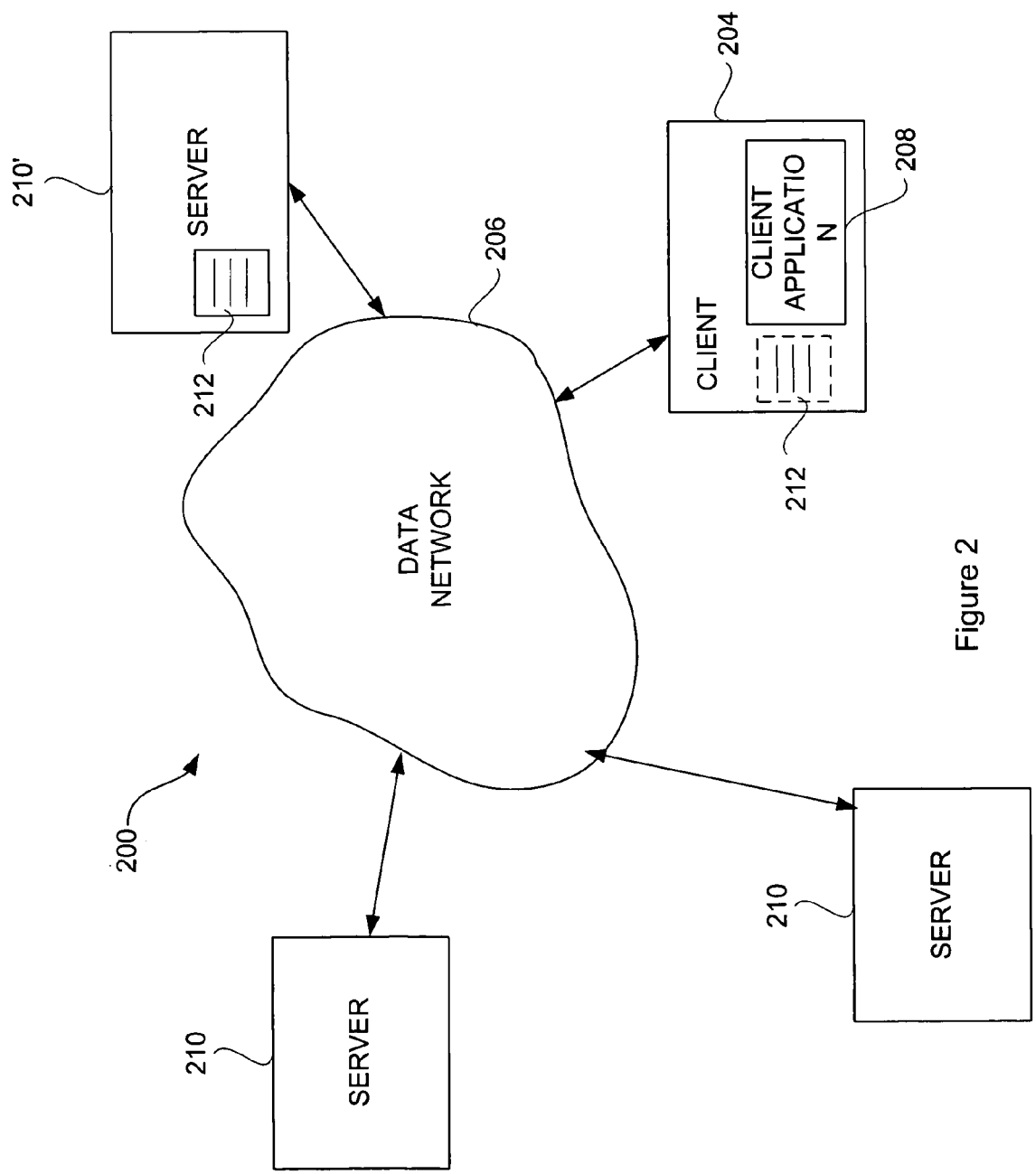
FIG. 2 is a block diagram of a computer network according to one embodiment of the invention.

FIG. 2 is a block diagram of a computer network 200 according to one embodiment of the invention. The computer network 200 includes one or more servers 210. Typically, the computer network 200 would include a plurality of different clients 204. Each client 204 includes a client application 208. The client application 208 is an application program (e.g., software application) that operates on the client 204, which is a computing device. The client 204 is coupled to the server 202 through a data network 206. Hence, any of the clients 204 can request remote entry point file 212 from the server 210' such that it is locally accessible to client application 208. In one embodiment, the remote entry point file, once retrieved from the server 210', can be stored in volatile memory at the client 204. Once the client application 208 has access to remote entry point file 212, it can then access any one of the one or more servers 210 as directed by the remote entry point file 212. In one embodiment, the data network 206 includes at least a portion of the Internet. The clients 204 can vary with application but generally are computing devices that have memory storage (e.g., both volatile and non-volatile). Often, the clients 204 are personal computers or other computing devices.

Figure 3:
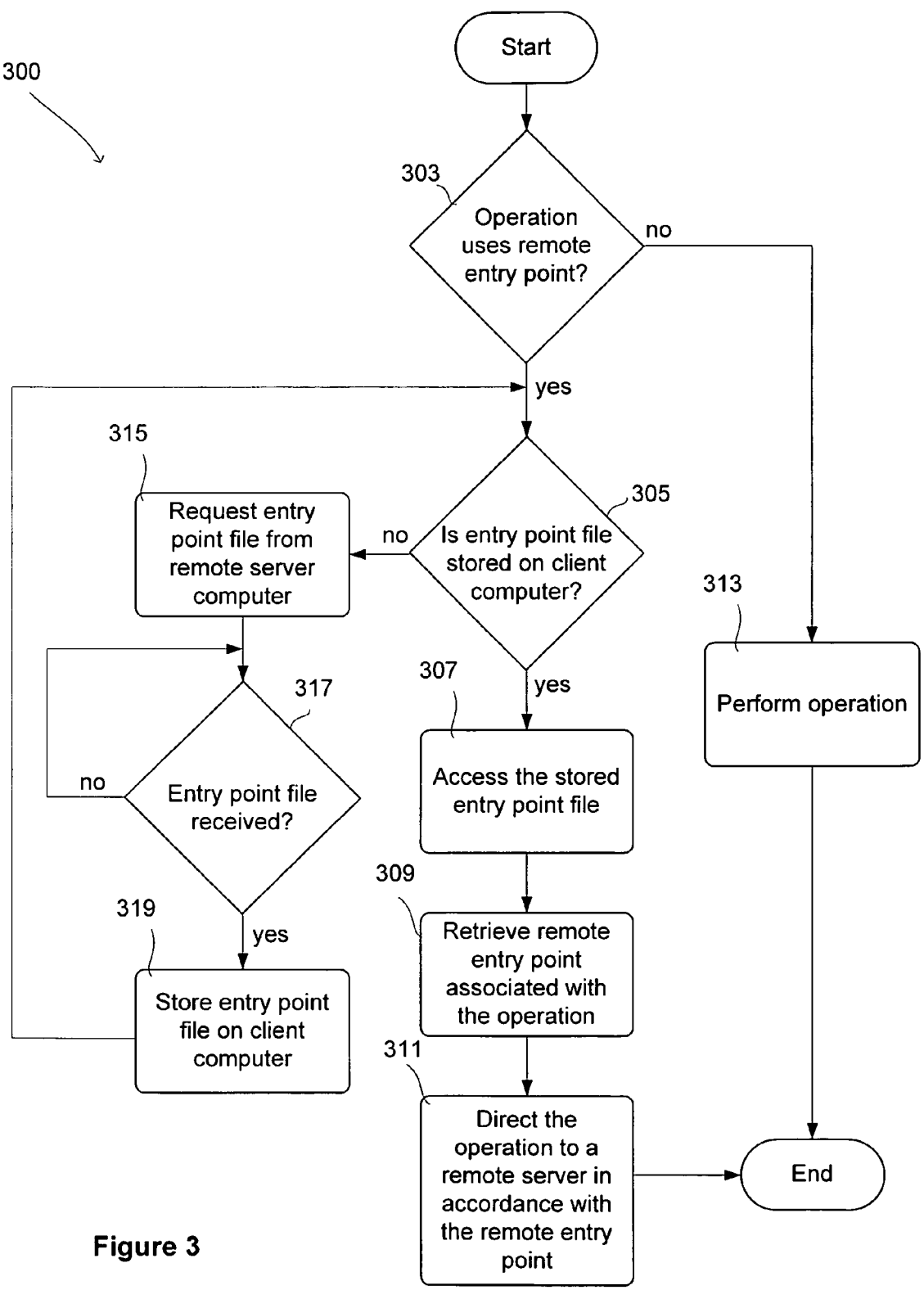
FIG. 3 is a flow diagram of a client remote entry point retrieval process according to one embodiment of the invention.

FIG. 3 is a flow diagram of a client-side remote entry point retrieval process 300 according to one embodiment of the invention. The client-side remote entry point retrieval process 300 can be performed on a client computer, such as the client computer 250 shown in FIG. 7A.

The client-side remote entry point retrieval process 300 begins with a decision 303 that determines whether an operation being performed at the client computer uses a remote entry point. The operation is typically one of many different operations that can be performed by a client application operating on the client computer. In one implementation, the client application is a media management application. The operation being performed can be initiated by a user control provided on a graphical user interface for the client application. For example, the user controls provided on the graphical user interface can be, for example, a text box, a radio button, or other user control. A remote entry point can be, for example, a uniform resource locator (URL) or an Internet protocol (IP) address (with or without sub-domain or path). When the decision 303 determines that an entry point is not used, then the operation is performed 313 at the client computer and the process ends without any usage of remote entry points.

On the other hand, if the decision 303 determines that the operation uses a remote entry point, then a decision 305 determines whether a remote entry point file having the remote entry point is stored on the client computer. If the decision 305 indicates that the remote entry point file is stored on the client computer, then the stored remote entry point file is accessed 307 in order to retrieve 309 the remote entry point associated with the operation. Once the remote entry point associated with the operation has been retrieved 309, the client-side remote entry point retrieval process 300 directs 311 the operation to a remote server in accordance with the remote entry point and the remote entry point retrieval process 300 ends. As such, the operation being performed by the client application can communicate with the appropriate remote server (or server application thereon).

Alternatively, if the decision 305 determines that the remote entry point file is not stored on the client computer, then the client-side remote entry point retrieval process 300 makes a request 315 for the remote entry point file from a remote server computer. Next, a decision 317 determines whether the remote entry point file has been received. When the decision 317 determines that the remote entry point file has not yet been received, the client-side remote entry point retrieval process 300 returns to repeat the decision 317 until the remote entry point file is received. When the decision 317 determines that the remote entry point file has been received, the remote entry point file is stored 319 on the client computer and the client-side remote entry point retrieval process 300 returns to decision 305 and subsequent blocks.

Figure 4:
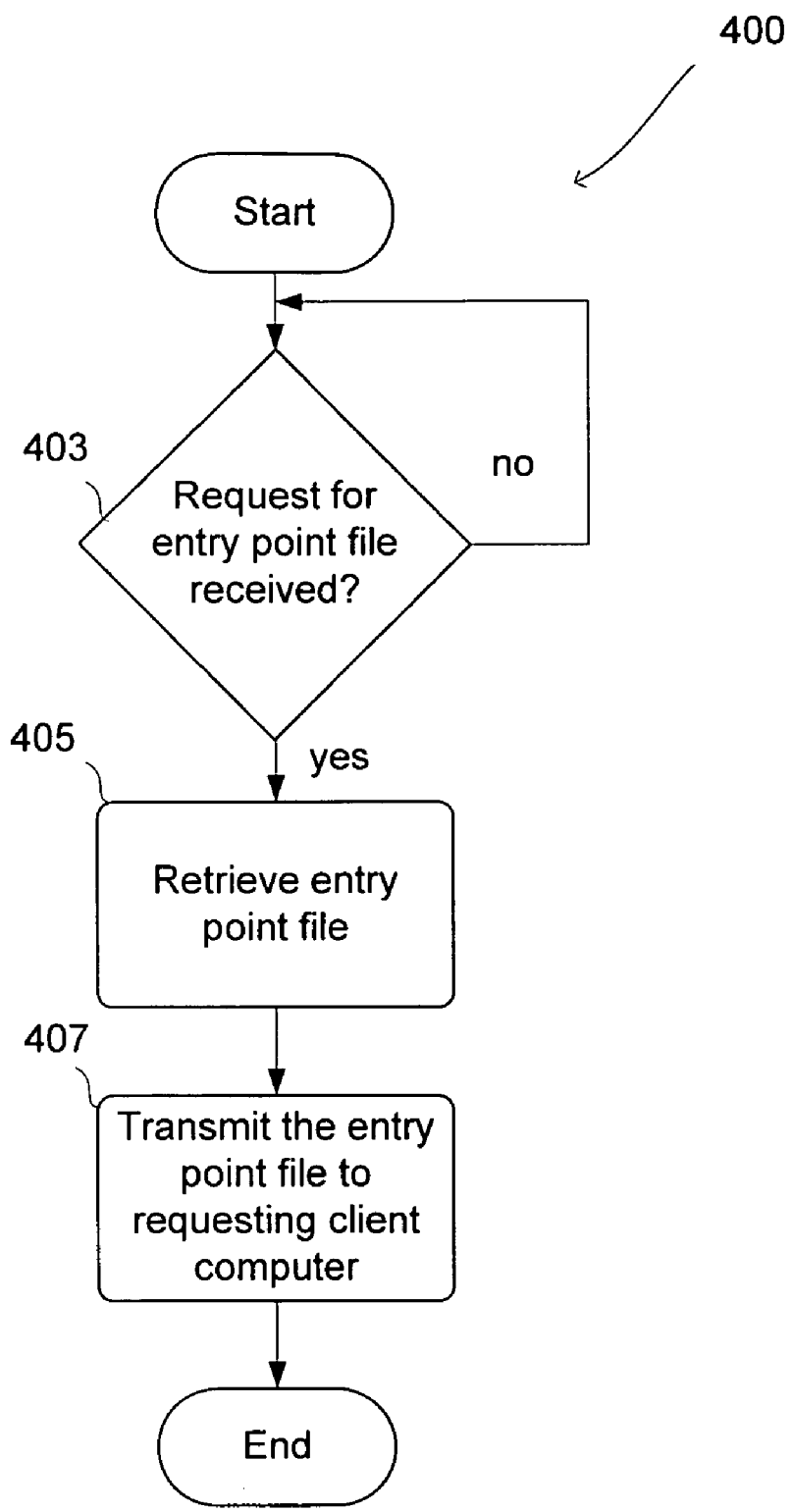
FIG. 4 is a flow diagram of a server-side remote entry point file retrieval process in accordance with one embodiment of the invention.

FIG. 4 is a flow diagram of a server-side remote entry point file retrieval process 400 in accordance with one embodiment of the invention. The server-side remote entry point retrieval process 400 can be performed on a server computer, such as any of the servers shown in FIG. 2. The server-side remote entry point file retrieval process 400 begins with a decision 403 that determines whether a request for a remote entry point file has been received. If no request has been received, the server-side remote entry point file retrieval process 400 returns to repeat the decision 403. Here, the server computer can await a request for a remote entry point file from a client computer. When decision 403 determines that a request has been received, the remote entry point file is retrieved 405 at or by the server computer. Thereafter, the remote entry point file is transmitted 407 to the requesting client computer. Following the operation 407, the server-side remote entry point file process 400 ends.

In one embodiment, there can be multiple sets of remote entry points that a client application might use to interact with a remote server. Each of these sets of remote entry points can be provided as a file containing a list of remote entry points. As an example, a client application operating on a client machine can perform non-secure or secure communication with remote servers. For example, the secure communications can use a secure protocol, such as https or secure sockets layer techniques for security. The remote server can be referred to as a secure server when secure communications are used with client applications. For example, secure communications can be used for a user login because any communication of a user's private data (e.g., password) should be protected.

Figure 5:
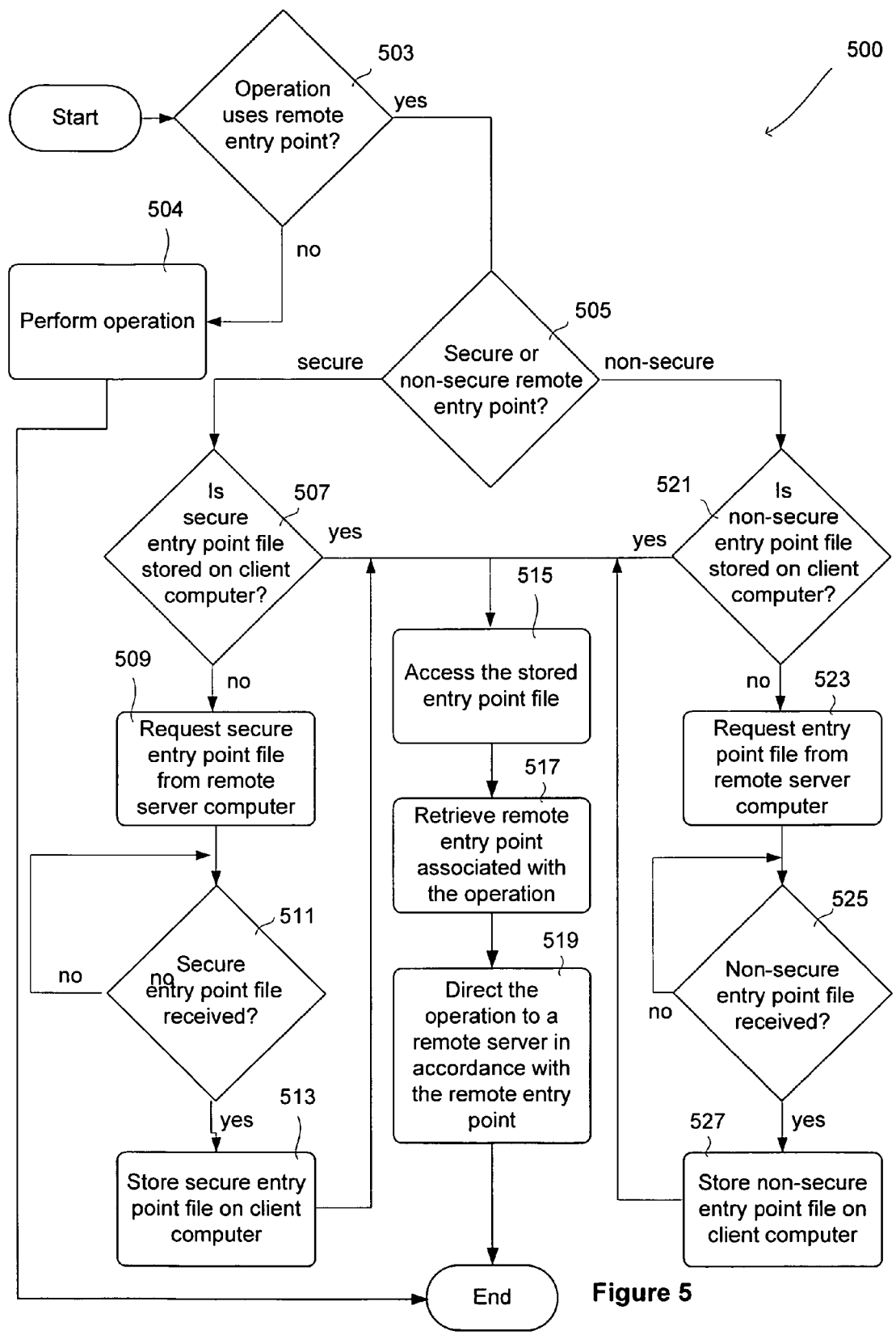
FIG. 5 is a flow diagram of a secure remote entry point retrieval process in accordance with one embodiment of the invention.

FIG. 5 is a flow diagram of a client-side secure/non-secure remote entry point retrieval process 500 in accordance with one embodiment of the invention. The client-side secure/non-secure remote entry point retrieval process 500 can be performed on a client computer, such as the client computer 250 shown in FIG. 7A.

The client-side secure/non-secure remote entry point file retrieval process 500 begins with a decision 503 that determines whether an operation being performed at the client computer uses a remote entry point. The operation is typically one of many different operations that can be performed by a client application operating on the client computer. In one implementation, the client application is a media management application. The operation being performed can be initiated by a user control provided on a graphical user interface for the client application. For example, the user controls provided on the graphical user interface can be, for example, a text box, a radio button, or other user control. A remote entry point can be, for example, a uniform resource locator (URL) or an internet protocol (IP) address (with or without subdomain or path). When the decision 503 determines that a remote entry point is not used, then the operation is performed 504 and the secure/non-secure remote entry point retrieval process 500 ends without any usage of remote entry points.

On the other hand, if decision 503 determines that the operation uses a remote entry point, then a decision 505 determines whether the operation being performed uses a secure remote entry point or a non-secure entry point. If the operation uses a secure remote entry point, then a decision 507 determines whether the secure remote entry point file having the remote entry point is stored on the client computer. If the decision 507 determines that the secure remote entry point file is not stored on the client computer, then the client-side secure/non-secure remote entry point file retrieval process 500 makes a request 509 for a secure remote entry point file from a remote server computer. Thereafter, a decision 511 determines whether the secure remote entry point file has been received. When the decision 511 determines that the secure remote entry point file has not yet been received, the client-side secure/non-secure remote entry point process 500 returns to repeat the decision 511 until the secure remote entry point file has been received. Once the decision 511 determines that the secure remote entry point file has been received, the secure remote entry point file is stored 513 on the client computer and the client-side secure/non-secure remote entry point file retrieval process 500 proceeds to access 515 the stored remote entry point file, retrieve 517 the remote entry point associated with the operation, and then direct 519 the operation to a remote server in accordance with the remote entry point. Thereafter, the client-side secure/non-secure remote entry point file retrieval process 500 ends. Alternatively, if decision 507 determines that the secure remote entry point file is stored on the client computer, the secure/non-secure remote entry point retrieval process 500 continues directly to operation 515 and subsequent blocks.

On the other hand, if the decision 505 determines that the operation uses a non-secure remote entry point, then a decision 521 determines whether the non-secure remote entry point file is stored on the client computer. If decision 521 determines that the secure remote entry point file is stored on the client computer, then client-side secure/non-secure remote entry point file retrieval process 500 continues on to operation 515 and subsequent blocks. Alternatively, if the decision 521 determines that the non-secure remote entry point file is not stored on the client computer, then the client-side secure/non-secure remote entry point file retrieval process 500 makes a request 523 for the non-secure remote entry point file from a remote server computer. Here, the remote server computer can be the same or different than the remote server computer used at operation 509. After making the request 523, a decision 525 determines whether the non-secure remote entry point file has been received. If the non-secure remote entry point file has not yet been received, the client-side secure/non-secure remote entry point file retrieval process 500 returns to repeat the decision 525 until the non-secure remote entry point file has been received. Once the decision 525 determines that the non-secure remote entry point file has been received, then the non-secure remote entry point file is stored on the client computer and the client-side secure/non-secure remote entry point file retrieval process 500 continues to operation 515 and subsequent blocks.

Figure 6:
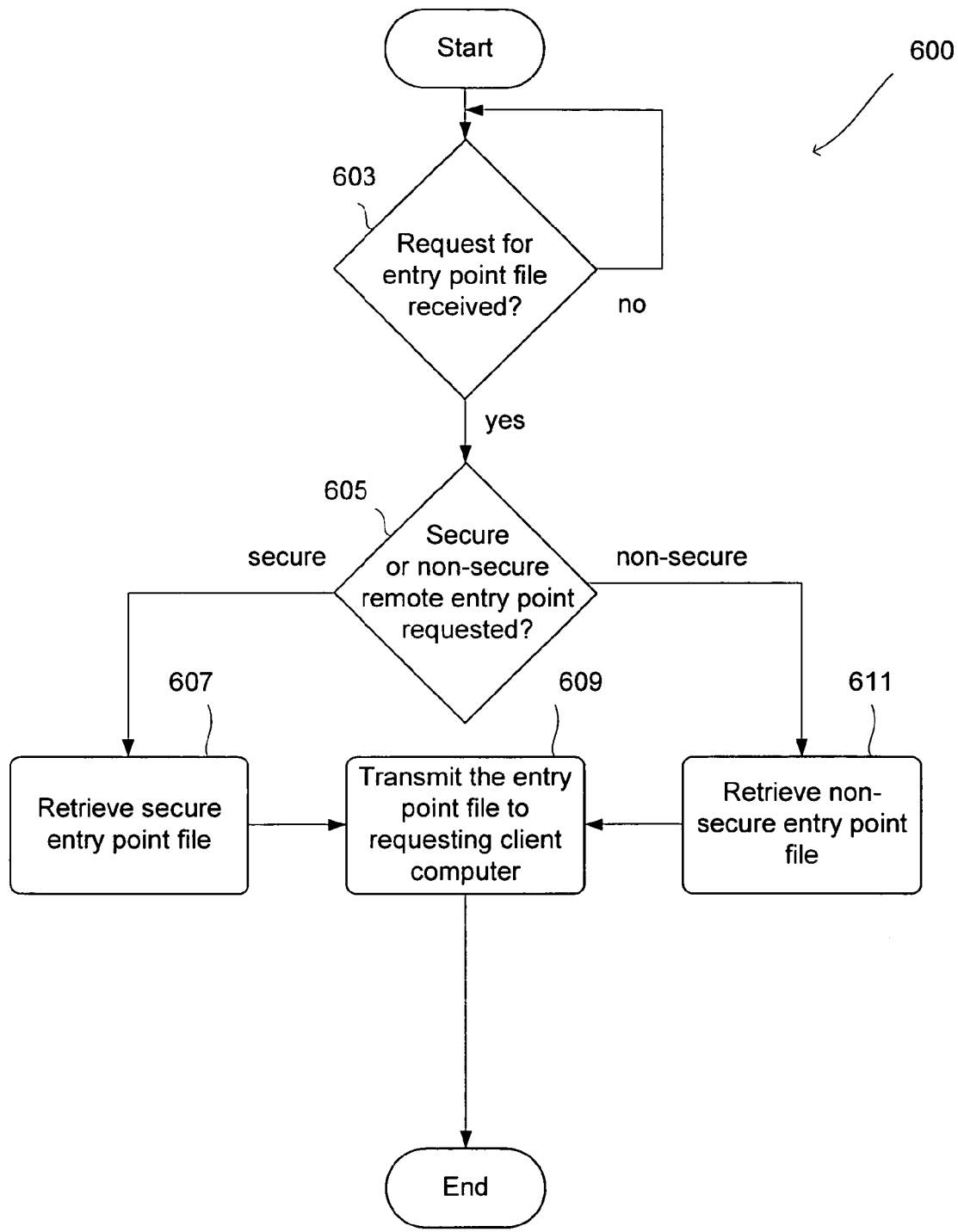
FIG. 6 is a flow diagram of a server-side secure remote entry point file retrieval process in accordance with one embodiment of the invention.

FIG. 6 is a flow diagram of a server-side secure/non-secure remote entry point file retrieval process 600 in accordance with one embodiment of the invention. The server-side secure/non-secure remote entry point retrieval process 600 can be performed on a server computer, such as any of the servers shown in FIG. 2.

The server-side secure/non-secure remote entry point file retrieval process 600 begins with a decision 603 that determines whether a request for a remote entry point file has been received. If no request has been received, the server-side secure/non-secure remote entry point file retrieval process 600 returns to repeat the decision 603. Here, the server computer can await a request for a remote entry point file from a client computer. When decision 603 determines that a request has been received, a decision 605 determines whether a secure or non-secure remote entry point file has been requested. If a secure remote entry point file has been requested, then the server-side secure/non-secure entry point retrieval process 600 retrieves 607 a secure remote entry point file. Alternatively, if the decision 605 determines that a non-secure remote entry point file has been requested, then a non-secure remote entry point file is retrieved 607. The retrieval 607 of the secure remote entry point file or the retrieval 611 of the non-secure remote entry point file can be performed by or at the server computer. Following the retrieval 607 and 611, the retrieved remote entry point file is transmitted 609 to the requesting client computer. Following the operation 609, the server-side secure/non-secure remote entry point file retrieval process 600 ends.

As noted above, when a client application invokes an operation, the operation may utilize a remote entry point to direct performance of some or all of the operation to a remote server. The nature or type of operation using remote entry points can vary with client application. One example of a client application is a media management application. For example, one representative media management application is iTunes™, produced by and available from Apple Computer, Inc. of Cupertino, Calif. Examples of operations associated with a media management application that could utilize remote entry points can, for example, include search, browse, buy, login, customer service, etc. By way of example, a search operation via a client application is described below according to one embodiment of the invention. Referring back to FIG. 1, the program control 105 may be implemented as a text box, wherein a user enters text (i.e., a search string) into the text box and then initiates a search for files on a remote server that match the text. In this case, the user enters a search string into the aforementioned text box and instructs the client application to perform the search by pressing the enter key or clicking on a search button, for example. The client application attempts to carry out the search according to the user's instructions. In one implementation of the invention, the search function is determined to require a remote entry point, which the client application must obtain before the search can proceed. The client can obtain the needed remote entry point by, for example, one of the methods described in reference to FIG. 3 or 5 in order to locate the remote server that it will use in order to perform the search. An exemplary remote entry point, provided in a URL format, is as follows.

search<string>http://server.domain.com/DirectAction/
   search</string>

In this example, "search" is the type of operation and the associated remote entry point is "http://server.domain.com/DirectAction/search". The search string is passed to the remote server according to the remote entry point, where the search is performed. The appropriate information is passed back to the requesting client application such that the results are displayed to the user.

Figure 7A:
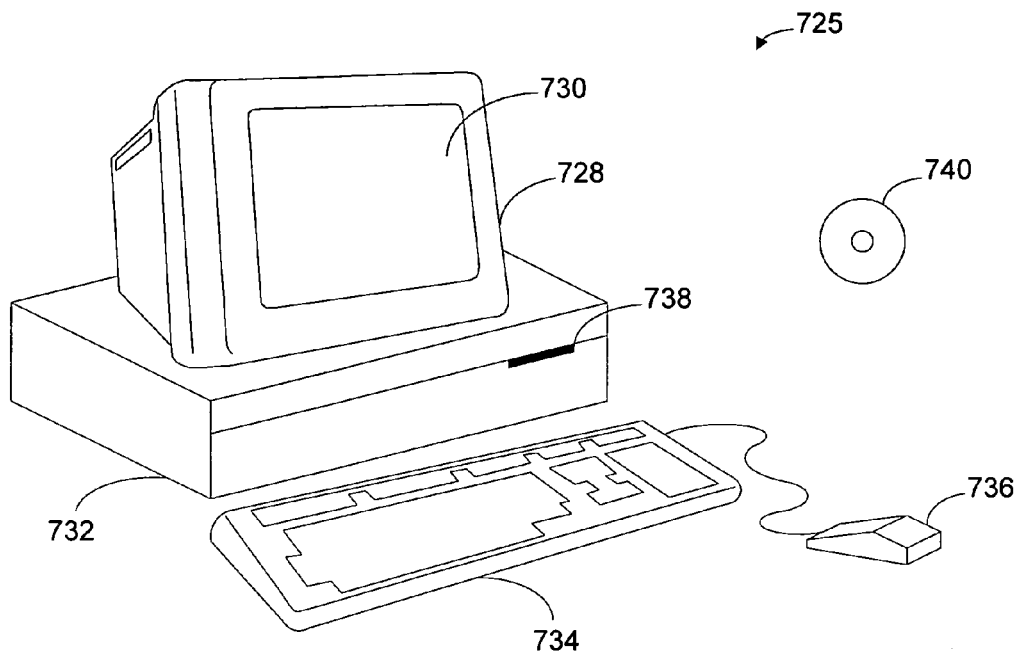
FIG. 7A shows a computer system according to one embodiment of the invention.

FIG. 7A shows a computer system 725 that includes a display monitor 728 having a single or multi-screen displays 730 (or multiple displays), cabinet 732, keyboard 734, and mouse 736. Cabinet 732 houses a drive 738, such as a CD-ROM or floppy drive, system memory and a hard drive (see FIG. 7A) which may be utilized to store and retrieve software programs incorporating computer code that implements the present invention, data for use with the invention, and the like. Although CD-ROM 740 is shown as an exemplary computer readable storage medium, other computer readable storage media including floppy disk, tape, flash memory, system memory, and hard drive may be utilized. In one implementation, an operating system for the computer system 725 is provided in the system memory, the hard drive, the CD-ROM 740 or other computer readable storage medium and serves to incorporate the computer code that implements the invention.

Figure 7B:
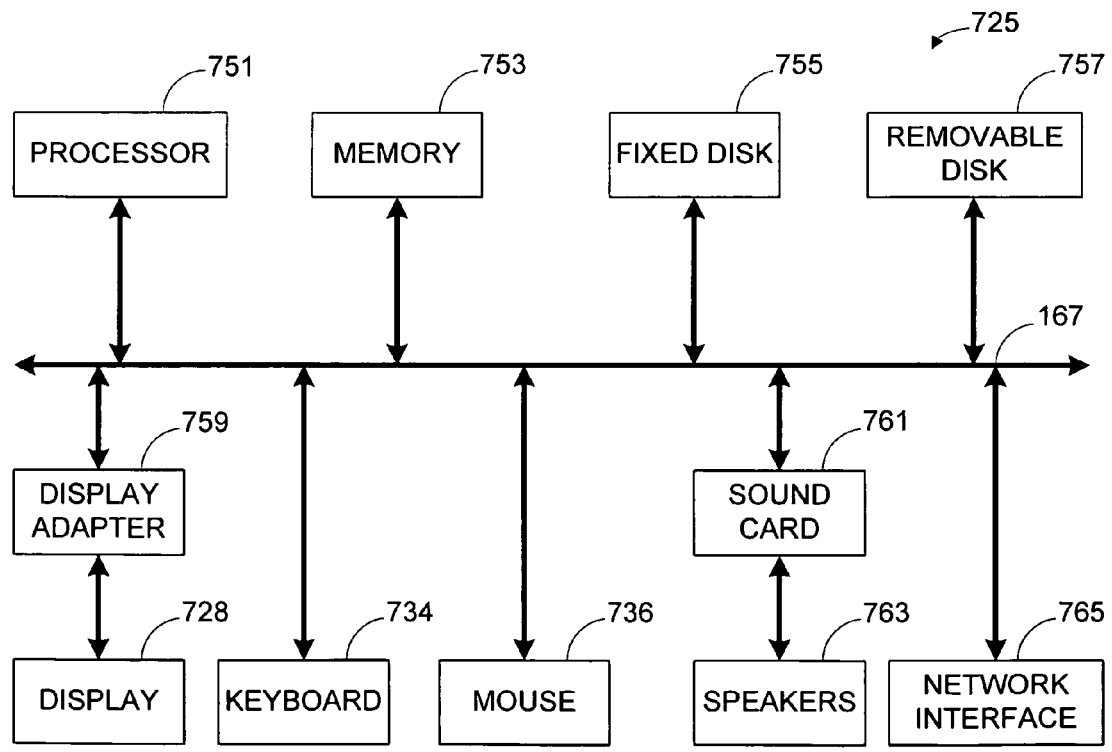
FIG. 7B is a system block diagram of a computer system used to execute the software of an embodiment of the invention.

FIG. 7B shows a system block diagram of a computer system 750 used to execute the software of an embodiment of the invention. As in FIG. 7A, computer system 750 includes display monitor 728 and keyboard 734, and mouse 736. Computer system 725 further includes subsystems such as a central processor 751, system memory 753, fixed storage 755 (e.g., hard drive), removable storage 757 (e.g., CD-ROM drive), display adapter 759, sound card 761, speakers 763, and network interface 765. The operating system and client application are normally, but not necessarily, resident in the system memory 753 during its execution. Other computer systems suitable for use with the invention may include additional subsystem or fewer subsystems. For example, another computer system could include more than one processor 751 (i.e., a multi-processor system) or one or more levels of a cache memory.

The system bus architecture of computer system 725 is represented by arrows 767. However, these arrows are illustrative of any interconnection scheme serving to link the subsystems. For example, a local bus could be utilized to connect the central processor to the system memory and display adapter. Computer system 725 shown in FIG. 7B is but an example of a computer system suitable for use with the invention. Other computer architectures having different configurations of subsystems may also be utilized.

The various aspects, features, embodiments or implementations of the invention described above can be used alone or in various combinations.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that an application using a remote entry point file does not require remote entry points to be hard-coded, thus allowing for flexibility as to which remote server will be used for a particular operation at any given time. Another advantage of the invention is that a remote entry point file may be generated dynamically upon request from a client computer, thereby better enabling network managers to balance server-load among several remote servers. Still another advantage of the invention is the possibility of having entry point files tailored specifically according to geographical location of the client computer, thus using remote servers that are closer in proximity to the client computers.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer implemented method for communicating between a client application operating on a client computer and a plurality of server computers, comprising:

determining if a client application operation requires a remote entry point;

obtaining, at the client computer, a set of remote entry points for at least one remote server computer, the remote entry points in the set of remote entry points pertaining to different operations that are able to be performed at the least one remote server computer;

retrieving a particular remote entry point from the set of remote entry points, the particular remote entry point being associated with the client application operation; and directing the client application operation to the remote server in accordance with the particular remote entry point, wherein said retrieving includes at least (i) locating the particular remote entry point having an attribute that matches the client application operation from the set of remote entry points at the client computer, and (ii) retrieving the particular remote entry point that has been located.

2. A computer-implemented method as recited in claim 1, wherein said obtaining comprises:

requesting the set of remote entry points from a remote server computer; and receiving the set of remote entry points from the remote server computer.

3. A computer-implemented method as recited in claim 2, wherein said obtaining further comprises:

storing the set of remote entry points on the client computer.

4. A computer-implemented method as recited in claim 3, wherein said storing operates to store the set of remote entry points in volatile memory at the client computer.

5. A computer-implemented method as recited in claim 4, wherein said obtaining further comprises:

determining whether the set of remote entry points is already stored in the volatile memory at the client computer; and receiving the set of remote entry points from the volatile memory at the client computer when said determining determines that the set of remote entry points is already stored in the volatile memory at the client computer.

6. A computer-implemented method as recited in claim 1, wherein said obtaining further comprises:
   determining whether the set of remote entry points is already stored at the client computer and is valid; and
   receiving the set of remote entry points from the client computer when said determining determines that the set of remote entry points is already stored and is valid at the client computer.

7. A computer-implemented method as recited in claim 1, wherein the set of remote entry points is provided as an entry point file.

8. A computer-implemented method as recited in claim 1, wherein the set of remote entry points includes at least a list of URLs.

9. A computer-implemented method as recited in claim 1, wherein the client application operation is a secure operation.

10. A computer-implemented method as recited in claim 9, wherein at least one of the remote entry points within the set of remote entry points is a secure remote entry point.

11. A computer-implemented method as recited in claim 1, wherein the client application is a media management application.

12. A computer-implemented method as recited in claim 1, wherein said locating comprises searching through the set of remote entry points to locate the particular remote entry point that has an attribute that matches the client application operation.

13. A computer-implemented method as recited in claim 12, wherein said searching uses text string matching to locate the particular remote entry point.

14. A computer-implemented method as recited in claim 1, wherein the set of remote entry points is provided as an entry point file.

15. A computer-implemented method as recited in claim 14, wherein the client application is a media management application.

16. A computer-implemented method as recited in claim 15, wherein the set of remote entry points includes at least a list of URLs.

17. A system for communicating between a client computer and a plurality of server computers, comprising: a client computer including at least a processor, volatile memory and a storage disk drive; and a plurality of server computers, wherein said client computer can communicate with said server computer via a data network wherein said client computer performs a client application and in doing so said processor executed computer program code, said computer program code includes at least:
   determining if a client application operation requires a remote entry point;
   obtaining, at said client computer, a set of remote entry points for at least one remote server computer;
   retrieving a particular remote entry point from the set of remote entry points, the particular remote entry point being associated with the client application operation; and
   directing the client application operation to the remote server in accordance with the particular remote entry point,
   wherein said retrieving includes at least (i) locating the particular remote entry point having an attribute that matches the client application operation from the set of remote entry points at the client computer, and (ii) retrieving the particular remote entry point that has been located.

18. A system as recited in claim 17, wherein the set of remote entry points is stored at said client computer only in the volatile memory.

19. A computer readable medium including at least executable computer program code stored thereon for communicating between a client application operating on a client computer and a plurality of server computers, said computer readable medium comprising:
   computer program code for determining if a client application operation requires a remote entry point;
   computer program code for obtaining a set of remote entry points for at least one remote server computer, the remote entry points in the set of remote entry points pertaining to different operations that are able to be performed at the least one remote server computer;
   computer program code for retrieving a particular remote entry point from the set of remote entry points, the particular remote entry point being associated with the client application operation; and
   computer program code for directing the client application operation to the remote server in accordance with the particular remote entry point,
   wherein said computer program code for retrieving includes at least computer program code for locating the particular remote entry point having an attribute that matches the client application operation from the set of remote entry points at the client computer, and computer program code for retrieving the particular remote entry point that has been located.

20. A computer readable medium as recited in claim 19, wherein the client application is a media management application.

* * * * *